US005609834A

United States Patent [19]
Hamada et al.

[11] Patent Number: 5,609,834
[45] Date of Patent: Mar. 11, 1997

[54] PLATE REFORMER

[75] Inventors: Kouki Hamada, Yokohama; Minoru Mizusawa, Matsudo; Minoru Koga, Kawasaki, all of Japan

[73] Assignee: Ishikawajima-Harima Heavy Industries Co., Ltd., Tokyo, Japan

[21] Appl. No.: 497,207

[22] Filed: Jun. 30, 1995

[30] Foreign Application Priority Data

Jul. 5, 1994 [JP] Japan .................................. 6-174877

[51] Int. Cl.$^6$ .................. B01J 8/04; C10J 3/00; H01M 8/04
[52] U.S. Cl. .................. 422/196; 422/197; 422/198; 429/17; 429/19
[58] Field of Search .................. 422/196, 197, 422/198, 203, 220; 48/94, 196 A, 214; 429/17, 19, 16, 20, 26

[56] References Cited

U.S. PATENT DOCUMENTS

| | | | |
|---|---|---|---|
| 4,933,242 | 6/1990 | Koga et al. | 429/19 |
| 5,015,444 | 5/1991 | Koga et al. | 422/195 |
| 5,270,127 | 12/1993 | Koga et al. | 427/17 |

FOREIGN PATENT DOCUMENTS

| | | |
|---|---|---|
| 0308976 | 3/1989 | European Pat. Off. . |
| 62-027305 | 6/1987 | Japan . |
| 62-167203 | 7/1987 | Japan . |
| 63-025201 | 6/1988 | Japan . |
| 63-291802 | 11/1988 | Japan . |
| 2186565 | 7/1990 | Japan . |
| 5105403 | 4/1993 | Japan . |
| 5253463 | 10/1993 | Japan . |

*Primary Examiner*—Christopher Kim
*Attorney, Agent, or Firm*—Trexler, Bushnell, Giangiorgi & Blackstone, Ltd.

[57] ABSTRACT

A plate reformer has a pair of combustion chambers, a reforming chamber in between the combustion chambers, and heat transfer plates sandwiched between the reforming chamber and the combustion chambers. The reforming chamber includes an inlet end for introduction of reforming gas and an outlet end for emission of reformed gas. The combustion chamber includes an inlet end for introduction of air and fuel and an outlet end for emission of combusted gas. A gas permeable partition wall is provided in the reforming chamber to partition it into a reforming reaction section having the inlet end and a heat exchange section having the outlet end. A gas permeable partition wall is provided in each combustion chamber to partition each into a combustion reaction section having the inlet end and a heat exchange section having the outlet end. The inlet end of the combustion chamber is aligned to the outlet end of the reforming chamber and the inlet end of the reforming chamber is aligned to the outlet end of the combustion chamber. The partition walls of the reforming chamber and the combustion chamber are provided such that they are approximately lined up and thus the reforming reaction section of the reforming chamber generally overlaps the heat exchange section of the combustion chamber, while the combustion reaction section of the combustion chamber generally overlaps the heat exchange section of the reaction chamber.

9 Claims, 3 Drawing Sheets

PLATE REFORMER

BACKGROUND OF THE INVENTION

1. Technical Field

The present invention relates to a plate reformer used for producing fuel gas which will be introduced to the anode (fuel electrode) of a fuel cell in a fuel cell power generation system.

2. Background Art

Among the reformers which reform introduced fuel into a hydrogen gas with using catalysts, plate reformers have conventionally been employed as they allow size-reduction and effective reformation by enabling a uniform combustion throughout said combustion chamber.

In the prior reformers, when reforming reaction is performed using natural gas($CH_4$) as reforming material gas under the existence of steam ($H_2O$), the reforming reaction is:

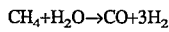

$$CH_4 + H_2O \rightarrow CO + 3H_2$$

Carbon monoxide and hydrogen are produced as reformed gases during the reaction above. Since this reforming reaction is endothermic, it is necessary to supply heat which is generated in combustion chambers to reforming chamber filled with reforming catalyst for achieving the reaction, and thus plate reformers have been employed wherein reforming chambers and combustion chambers are stacked up one after another.

However, the temperature experienced during the reforming reaction in the reformer is higher than the temperature desirable for operation of molten carbonate fuel cell (600°–650° C.) connected with the reformer, and thus the reforming material gas in the reforming chamber and the combustion gas in the combustion chambers must not flow in the same direction because if they did, the temperature of reformed gas at the exit would reach about 800° C., making direct introduction of the reformed gas to the fuel cell impossible.

Therefore a device has been considered wherein the direction of the gas flow in the reforming chamber is opposite to that of the gas flow in the combustion chamber so that the heat can be retrieved inside the reformer in order to improve heat efficiency of the reformer.

However, simply making the two flows opposite to each other as described above would result in lowered temperature at the exit in both flows (because either gas of which temperature is lower than the other's inevitably interferes and prevents another from achieving high temperature), and the too low temperature at the exit of the reforming chamber would cause part of the reformed gas to be reconverted to methane due to the reverse reaction.

Thus plate reformers wherein the combustion chambers and the reforming chambers have heat exchange sections at both entrance and exit as shown in FIG. 4(a) of the accompanying drawings have been employed.

A plate-shaped reforming chamber 2 filled with reforming catalyst 1 and a plate-shaped combustion chamber 4 filled with combustion catalyst 3 sandwich a heat transfer plate 5 between them, constituting a unit, and two of these units then sandwich a plate-shaped fuel introducing chamber 7 having on both sides the fuel dispersion plates 6 with a number of dispersion holes which allow fuel to flow into the catalyst-filled section of the combustion chambers 4 which are positioned to face each other, thus forming a plate reformer.

Introducing air (or combustion-support gases including oxygen) A to the combustion chamber 4, the fuel F to the fuel introducing chamber 7, the material gas NG for reforming (such as natural gas) and steam S to the reforming chamber 2, causes the fuel F to flow into the combustion chamber 4 through the dispersion holes on the fuel dispersion plate 6, to be combusted by air A therein. The heat generated by the combustion in the combustion chamber 4 is absorbed to the reforming chamber 2 side by way of the heat transfer plate 5, and because of the absorbed heat the material gas NG is then forced to react with the reformation catalyst I inside the reforming chamber 2.

In the plate reformer described above, in order to make heat exchange inside the reformer efficient, the direction of the reformed gas flow in the reforming chamber 2 is made opposite to that of the combusted gas flow in the combustion chamber 4. And also, on both entrance and exit sides of the reaction section X of the reforming chamber 2 filled with the reforming catalyst 1, as well as on both sides of the reaction section X of the combustion chamber 4 filled with the combustion catalyst 3, the heat exchange section Y and Z without catalyst, are provided respectively.

In a conventional fuel cell power generation system, the combustion temperature exceeds the maximum temperature which the combustion catalyst can resist when anode exhaustion gas (emitted from anode) is directly combusted. Therefore, in the plate reformer shown in FIG. 4(a), a fuel introducing chamber 7 is provided wherein fuel F supplied thereto is uniformly dispersed throughout the combustion chamber 4 so that uniform combustion throughout the combustion chamber and thus a temperature of the combustion catalyst which is only slightly higher than the reforming temperature (about 800° C.) can be achieved.

However, providing the heat exchange sections Y, Z on the entrance and exit sides of the reforming and the combustion chambers 2 & 4 increase the size of the system due to the space occupied by the heat exchange section Y and z shown in FIG. 4(a), causing a problem that the size reduction of the whole system cannot be achieved. In addition, since a considerable area is overlapped between the reaction section X of the reforming chamber 2 and the reaction section X of combustion chamber 4, a large discrepancy appears between the locations of the peaks of the temperature distribution profile II of reforming chamber 2 and the temperature distribution profile I of the combustion chamber 4, thus making it difficult to maintain the maximum temperature of the reforming chamber 2 at the exit as illustrated in FIG. 4(b).

In addition, since higher fuel utilization rate has been proposed recently to achieve higher efficiency of the fuel cell power generation system, concentration of anode gas (fuel gas) contained in the anode exhaustion emitted from the anode of the fuel cell tends to be too thin to supply energy required for reforming to the fuel introducing chamber 3 of the reformer described above.

In order to compensate this shortage, a device has been proposed in the specification of the U.S. Pat. No. 5,208,114, wherein anode exhaustion and cathode exhaustion of a fuel cell are introduced into a catalyst combustor, and then anode gas contained in the anode exhaustion is combusted by air contained in the cathode exhaustion to become a gas with a high temperature which is supplied to the plate reformer so that the sensible heat of the hot gas can be used for increasing the temperature of the reformed gas at the exit.

However, this system requires a catalyst combustor other than a reformer, making the whole system complicated.

SUMMARY OF THE INVENTION

An object of the present invention is to provide a plate reformer which allows controllably maintaining the most appropriate temperature of reformed gas at the exit of a reforming chamber.

A second object of the present invention is to provide a plate reformer which allows the most appropriate arrangement of reaction sections of reformer and combustion chamber.

A third object of the present invention is to provide a plate reformer which allows efficient heat retrieval from gases emitted from the reaction sections of the reforming and combustion chambers.

A fourth object of the present invention is to provide a fuel cell power generation system using a plate reformer with a new design.

According to one aspect of the present invention, there is provided a plate reformer wherein a reforming chamber is sandwiched by combustion chambers so that heat transfer plates also be sandwiched between the reforming chamber and the combustion chambers. Hereinabove each of the reforming and combustion chambers has gas entrance and exit, such that gas flows in the reforming chamber and in the combustion chamber be opposite to each other; and a gas permeable partition wall is provided for partitioning each of the reforming and the combustion chambers into entrance-side section and exit-side section according to the gas flow, as well as for passing gases through.

The reforming chamber includes:

a reforming reaction section which is the entrance-side section of the reforming chamber partitioned by the partition wall filled with reforming catalyst; and a heat exchange section which is the exit-side section of the partitioned reformer and filled with heat transfer component.

The combustion chamber includes:

a combustion reaction section which is the entrance-side section of the combustion chamber partitioned by the partition wall and filled with combustion catalyst; and a heat exchange section which is the exit-side of the partitioned combustion chamber and filled with heat transfer component.

According to a second aspect of the present invention, there is provided a plate reformer wherein a reforming chamber is sandwiched by combustion chambers so that heat transfer plates also be sandwiched between the reforming and the combustion chambers, and these three plate-shaped components are again sandwiched with fuel introducing chambers with a number of dispersion holes, forming a unit, a plurality of which is then vertically stacked up forming a reformer as whole.

Each of the reforming and combustion chambers has gas entrance and exit, such that the gas flows in the reforming chamber and in the combustion chamber be opposite to each other; and a gas permeable partition wall is provided for partitioning each of the reforming and the combustion chambers into entrance-side section and exit-side section according to the gas flow, as well as for passing gases through.

The reforming chamber includes:

a reforming reaction section which is the entrance-side section of the reforming chamber partitioned by the partition wall filled with reforming catalyst; and a heat exchange section which is the exit-side section of the partitioned reformer and filled with heat transfer component.

The combustion chamber includes:

a combustion reaction section which is the entrance-side section of the combustion chamber partitioned by the partition wall and filled with combustion catalyst; and a heat exchange section which is the exit-side of the partitioned combustion chamber and filled with heat transfer component.

The reforming and the combustion chambers are partitioned by the partition wall respectively, forming the reaction section on the entrance side filled with the catalyst and the heat exchange section on the exit side filled with the heat transfer component in each chamber, allowing each reaction section to be attached to the heat exchange section of its neighboring chambers so that the peak locations of temperature distribution profiles of the reformed and the combusted gases coincide with each other, resulting in an adequate temperature of the reformed gas at the exit.

The reforming material gas introduced into the reaction section of the reforming chamber is heated and reformingly reacted due to the sensible heat produced by the combusted gas in the area adjacent to the heat exchange section of the combustion chamber, then the reformed gas is emitted through the heat exchange section of the reforming chamber. During this process, the sensible heat from the reformed gas is transferred to the reaction section of the combustion chamber because the heat exchange section of the reforming chamber is adjacent to the reaction section of the combustion chamber. Thus, the locations of the graph-peaks of reformed gas and combusted gas in the temperature distribution can be coincident with each other.

DESCRIPTION OF THE PREFERRED EMBODIMENTS

Now, the preferred embodiments of the present invention will be explained with reference to the accompanying drawings.

Figure 1A:
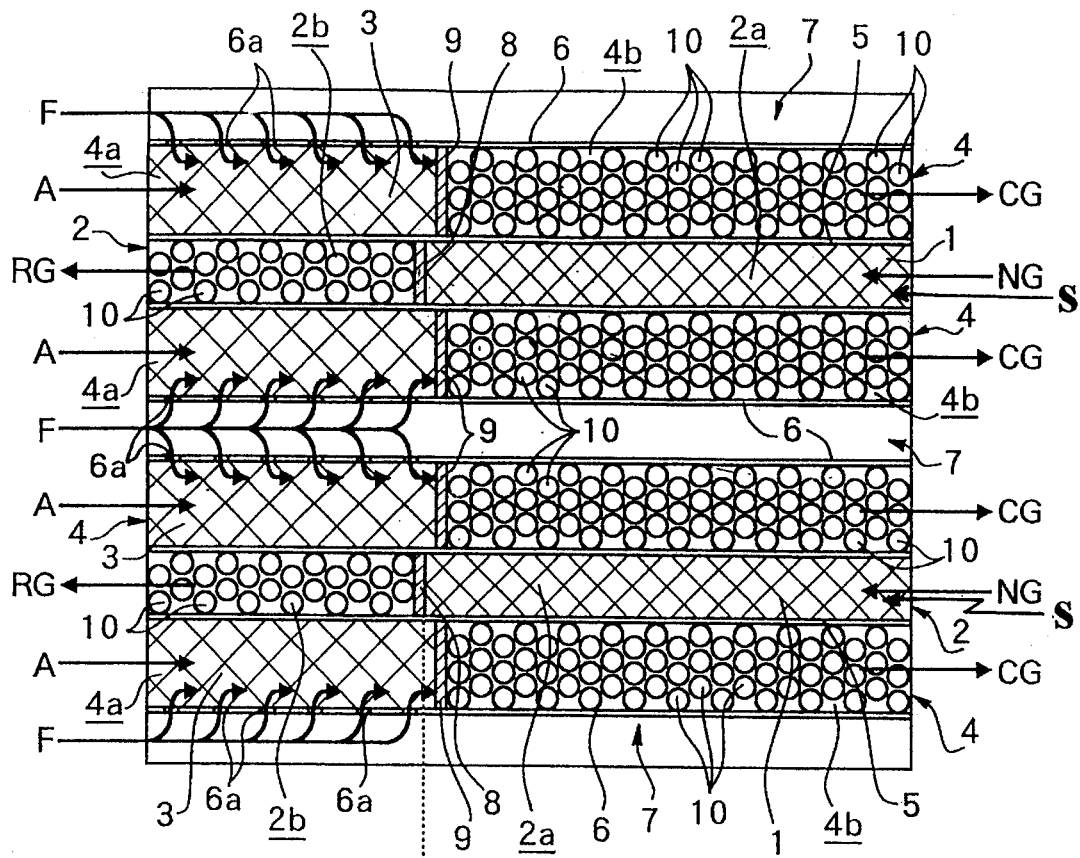
FIG. 1(a) shows a sectional view of an embodiment of a plate reformer of the present invention.
Figure 1B:
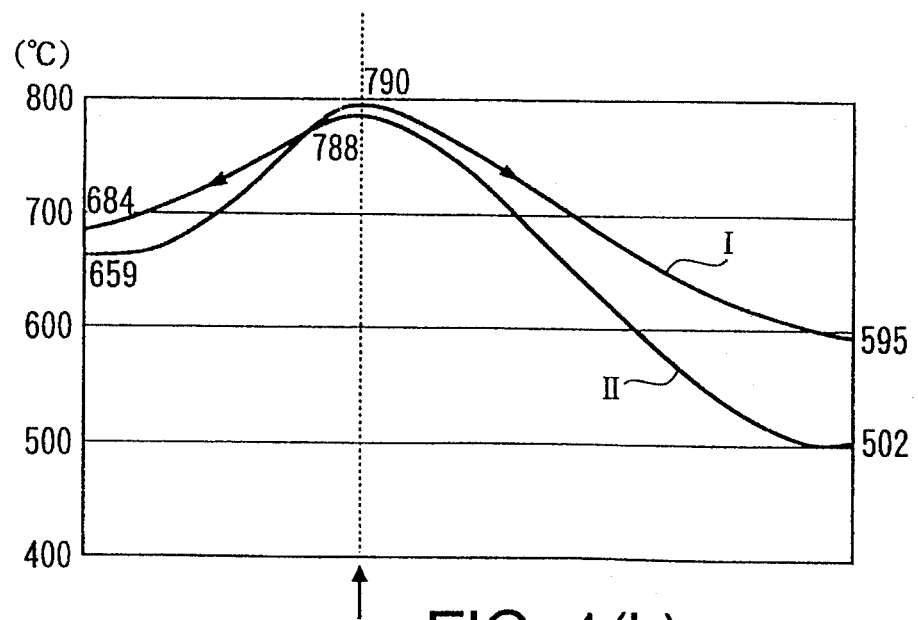
FIG. 1(b) shows temperature distribution profiles of reforming chamber (I) and combustion chamber (II).

A preferred embodiment of the present invention is shown in FIG. 1(a) and FIG. 1(b). A plate-shaped reforming chamber 2 is sandwiched with two plate-shaped combustion chambers 4 in the way that two heat transfer plates 5 are also sandwiched between the plate reformer and the combustion chambers, and these three plate-shaped components are again sandwiched with fuel introducing chambers 7 in the way that fuel distribution plate 6 with a number of dispersion holes 6a are sandwiched between the components and the fuel introducing chambers, forming a unit. The plurality of said unit is vertically stacked up. Entrances and exits of the reforming chamber 2 and the combustion chamber 4 are formed in each chamber so that the gas RG in the reforming chamber 2 flows in the opposite direction to that in which the combustion gas CG in the combusted chamber 4 does.

In the reforming chamber 2, a gas permeable partition wall 8 is provided forming two sections therein, making the one on the gas-entrance side reaction section 2a filled with reforming catalyst, while another on the gas-exit side heat exchange section 2b filled with alumina balls 10 as heat transfer component. In the combustion chamber 4, a gas permeable partition wall 9 is provided forming two sections, making the one on the gas-entrance side reaction section 4a filled with the combustion catalyst 3, while another on the gas-exit side heat exchange section 4b filled with alumina balls 10 as heat transfer component, such that the partition wall 9 be approximately lined up with the partition wall 8 of the reforming chamber 2. Additionally, a number of dispersion holes 6a are provided in the fuel dispersion plate 6 facing the fuel introducing chamber 7, only in the area adjacent to the reaction section 4a of the combustion chamber 4.

Next, the function of the plate reformer of the present invention will be described.

Introducing the reforming material gas NG and steam S to the reforming chamber 2 while introducing air (or combustion support gas including oxygen) A to the combustion chamber 4, with forcing fuel F to flow from the fuel introducing chamber 7 into the reaction section 4a of the combustion chamber 4 through each dispersion hole 6a on the fuel dispersion plate 6 (as indicated by arrows), causes uniform combustion throughout the reaction section 4a of the combustion chamber 4, emitting the combusted gas CG by way of the heat exchange section 4b.

On the other hand, the reforming material gas NG introduced into the reaction section 2a of the reforming chamber 2 first absorbs the sensible heat produced by the combusted gas CG and transferred to the reaction section 2a of the reforming chamber 2 through a part of the heat transfer plates 5 adjacent to the heat exchange section 4b of the combustion chamber 4, and then the gas is reformed to reformed gas RG through the reformation reaction by the reforming catalyst 1. The resulting reformed gas RG is emitted through the heat exchange section 2b having alumina balls 10 as the heat transfer component after permeating the partition wall 8, and in the heat exchange section 2b the gas RG can transfer its sensible heat to the reaction section 4a of the combustion chamber 4, because the heat exchange section 2b is stacked to the reaction section 4a, achieving the heat recovery. At this stage the temperature of the reformed gas RG drops at the exit of the reforming chamber, but it is not converted to the original gas because it has been completely reformed by experiencing the maximum temperature near the partition wall 8 which is the exit of the reaction section 2a.

The temperature profile in the reforming chamber 2 and the combustion chamber 4 during the reforming reaction shown in FIG. 1(b) has been experimentally confirmed. The curve I shows gas temperature in the combustion chamber 4 while the curve II corresponds to gas temperature in the reforming chamber 2. As obviously shown in FIG. 1(b), the gas in the reforming chamber 2 reaches the maximum temperature near the partition wall 8 between the reaction section 2a and the heat exchange 2b, and the gas in the combustion chamber 4 reaches the maximum temperature near the partition wall 9 between the reaction section 4a and the heat exchange section 4b, making the two graph-peaks of the temperature distribution coincide with each other.

In the plate reformer of the present invention, the reforming reaction section 2a of the reforming chamber 2 and the combustion reaction section 4a of the combustion 4 are arranged so that they hardly overlap each other, and this arrangement allows adjustment of length of each reaction section to the most appropriate one and also allows reduction of the system size as a whole because the heat exchange sections are required only on the gas-exit side.

In addition, filling the heat exchange sections 2b, 4b with the alumina balls 10 having a large heat-transfer factor reduces the amount of otherwise required expensive reforming catalyst 1 and combustion catalyst 3. Moreover, since there is less temperature difference between the hotter and cooler sides of the reaction section 4a of the combustion chamber 4, the combustion catalyst 3 can prolong its lifetime by achieving lower temperature during operation.

Figure 2:
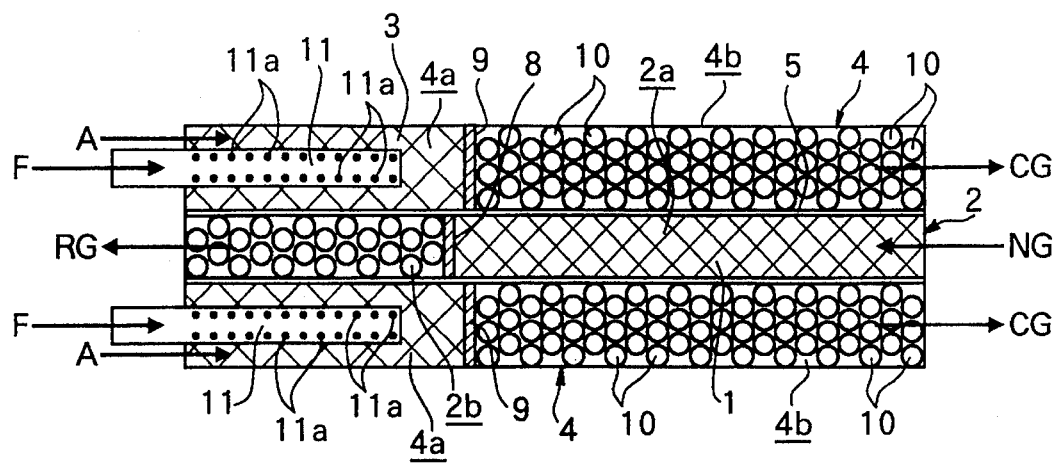
FIG. 2 shows a sectional view of another embodiment of the present invention.

Now turning to FIG. 2 that shows another embodiment of this present invention and comprises the similar components to those in FIG. 1. An adequate number of fuel introducing tubes 11 each of which has a closed front end and a number of dispersion holes 11a on its wall are insertingly positioned inside the reaction section 4a of the combustion chamber 4 so that the fuel F fed into the fuel introducing tubes 11 can be dispersedly introduced into the reaction section 4a of the combustion chamber 4 through the individual dispersion holes 11a, instead of having the multiple-layered arrangement of the fuel introducing chamber 7 with the fuel dispersion plate 6 between the combustion chambers 4.

In the embodiment shown in FIG. 2, the fuel supply tube 11 is equivalent to the fuel introducing chamber 7 in FIG. 1, thus, a more reduced-sized design with less thickness of the whole system can be provided by inserting the fuel introducing tube 11 into the reaction section 4a of the combustion chamber 4.

Next, a fuel cell power generation system having the plate reformer of the present invention in its cell will be explained in FIG. 3.

Figure 3:
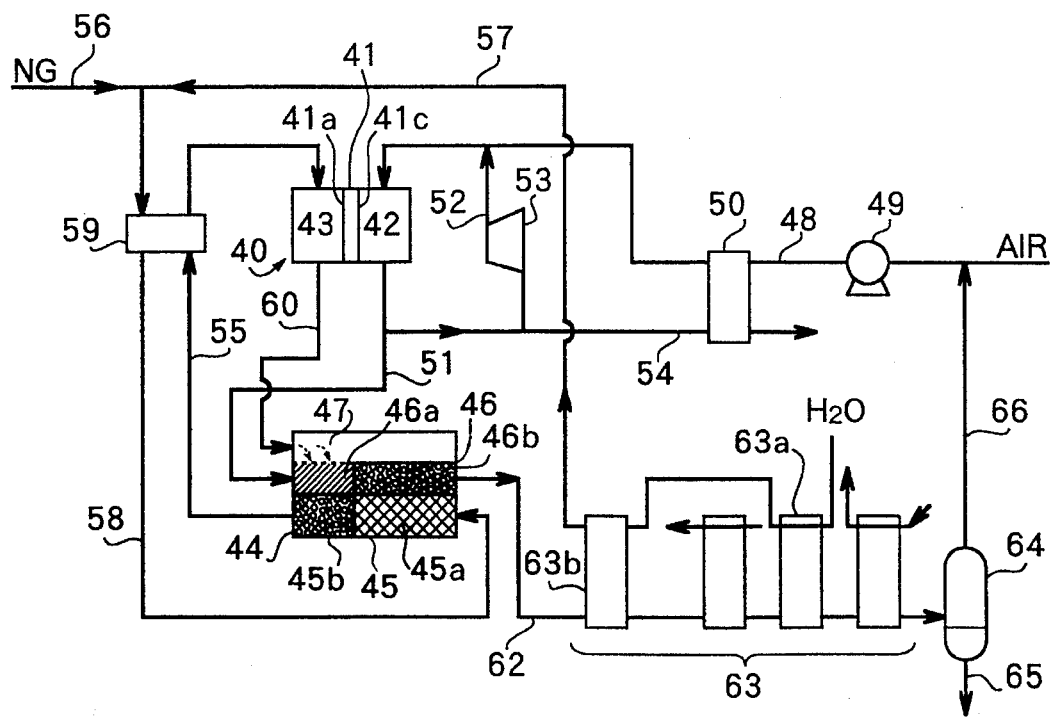
FIG. 3 schematically shows a fuel cell power generation system having the plate reformer of the present invention in its cell.
Figure 4A:
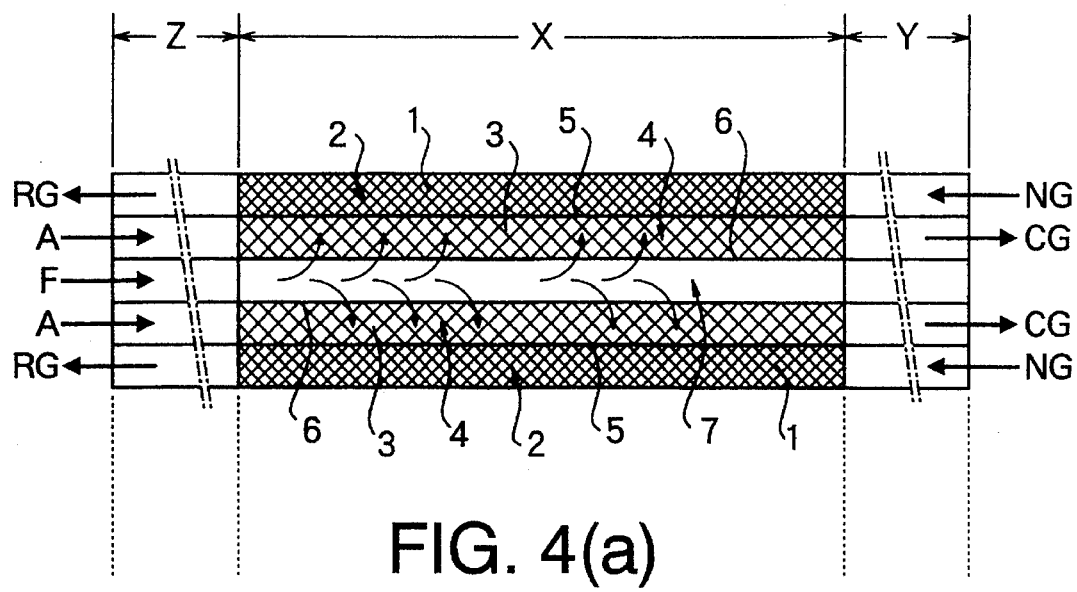
FIG. 4(a) shows a sectional view of a prior plate reformer.
Figure 4B:
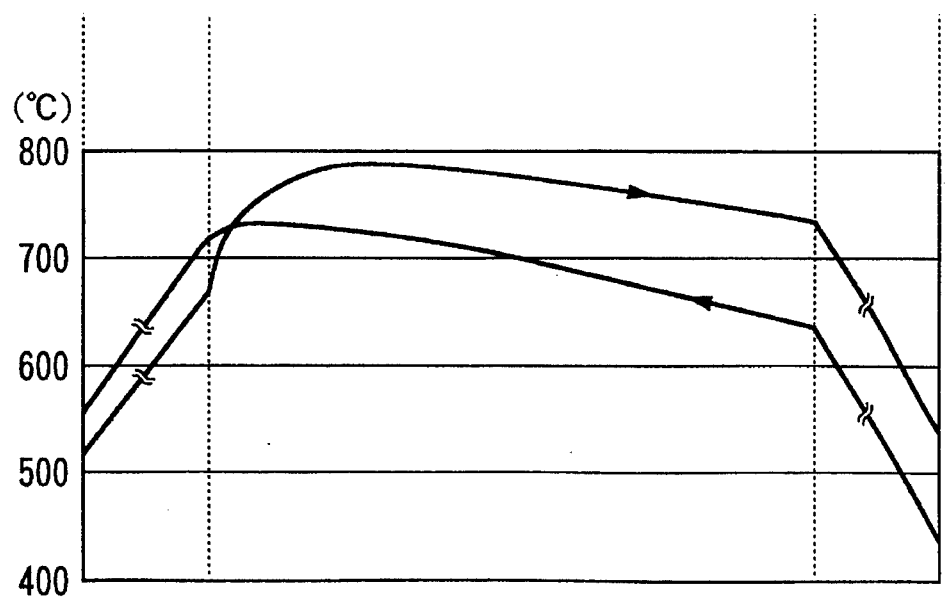
FIG. 4(b) shows temperature distribution profiles of a prior plate reformer.

FIG. 3 shows a fuel cell 40, wherein molten carbonate fuel cell 41 has anode electrode, cathode electrode and electrolyte plate sandwiched between the two electrodes, and cathode chamber 42 is formed on the cathode 41c side of the molten carbonate fuel cell 41 while anode chamber 43 is formed on anode 41a side of the fuel cell 41. The fuel cell arrangement 41 is depicted in an illustrative manner, but actually includes a plurality of fuel cells 41 stacked via separator plates (not shown). The separator plates form anode gas passages and cathode gas passages, and anode gas from the anode chamber 43 and cathode gas from the cathode chamber 42 are respectively fed to the anode 41a and the cathode 41c through the respective passages.

The reformer 44 of the present invention described above includes the reforming chamber 45, the combustion chamber 46, fuel introducing chamber 47 which are closely stacked one after another, and the reforming chamber 45 and the combustion chamber 46 are partitioned into the reaction sections 45a, 46a and the heat exchange sections 45b, 46b, respectively.

An air feed line 48 is connected to an entrance of the cathode chamber 42, and a blower 49 and an air preheater 50 are connected to the air feed line 48. A cathode exhaust gas line 51 is connected to the exit of the cathode chamber 42, and the reaction section 46a of the combustion chamber of the plate reformer 44 is connected of the cathode exhaust gas line 51. A cathode exhaust gas recirculation line 52 stems from the line 51, wherein the recirculation line 52 includes a blower 53 and introduces the cathode exhaust gas back to the cathode chamber 42. A cathode exhaust gas utilization line 54 for feeding the cathode exhaust gas to the air preheater 50 is also connected to the cathode exhaust gas recirculation line 52.

The entrance of the anode chamber 43 and the heat exchange section 45b of the reforming chamber of the reformer 44 are connected with each other by the anode gas feed line 55. Natural gas and steam are supplied as the reforming material to the reaction section 45a of the reforming chamber of the reformer 44. The feed line 56 for the natural gas NG merges with the steam feel line 57, and the reforming material which includes natural gas and steam is supplied to the reaction section 45a of the reforming chamber through the line 58. A heat exchange 59 is provided on the line 58 and the anode gas feed line 55. The heat exchanger 59 is used for the heat exchange between the reforming material and the reformed gas.

The exit of the anode chamber 43 is connected with the fuel introducing chamber 47 of the reformer 44 via the anode exhaust gas line 60.

The heat exchange section 46b of the combustion chamber 46 of the reformer 44 is connected with the exhausts gas line 62 to which a group of various heat exchangers 63 and a gas-liquid separator 64 are connected, respectively. Water separated in the gas-liquid separator 64 is dehydrated by line 65, and the gases containing $CO_2$ is led by a line 66 to the air feed line 48 which is located on the inlet side of the blower 49 so that $CO_2$ is fed to the cathode chamber 42 with the air.

The steam line 57 extends in a manner such that the water flows through the heat exchangers 63a and 63b of the above-mentioned group of heat exchangers 63. Accordingly, the water is heated to vapor or steam of a predetermined temperature before merging with the natural gas line 56.

In the foregoing description, the air and $CO_2$ from the air line 48 and the cathode exhaust gas from the cathode exhaust gas recirculation line 52 are fed to the cathode chamber 42 of the fuel cell arrangement 40 whereas the anode gas ($H_2$, CO, $CO_2$, $H_2O$ and others), which is the reformed gas reformed in the reforming chamber 45 of the reformer 44, is fed to the anode chamber 43 through the line 55 so that the reaction of the anode gas and the cathode gas takes place in the cell 41 to generate electricity.

Exhaust gases from the cathode chamber 42 and the anode chamber 43 are respectively introduced to the reaction section 46a of the combustion chamber and the fuel introducing chamber 47 via the lines 51 and 60, and the anode exhaust gas introduced into the combustion chamber 47 flows into the reaction section 46a of the combustion chamber and therein the unreacted combustible components among the anode exhaust gas is combusted with the unreacted oxygen among the cathode exhaust gas. By feeding the cathode exhaust gas and the anode, exhaust gas into the reaction section 46a of the combustion chamber and the fuel introducing chamber 47, the cathode chamber 42 and the anode chamber 43 become equal to each other in pressure, making differential pressure control between the cathode electrode and the anode electrode significantly easy.

The exhaust gas from the heat exhaust section 46b of the combustion chamber of the reformer 44 is then introduced to the heat exchangers 63a and 63b through the exhaust gas line 62. The exhaust gas is used to generate steam in the heat exchanger 63a and used to further heat the steam in the heat exchanger 63b.

The power generation allows increasing fuel utilization rate as well as achieving high reforming rate.

In addition, though air A is introduced into the reaction section 4a of the combustion chamber 4 with fuel F flowing into the reaction section 4a through the dispersed holes on the fuel introducing chamber 7 or the fuel introducing tube 11 in each embodiment above, fuel F may be introduced into the reaction section 4a of the combustion chamber 4 with air A flowing into the reaction section 4a through the air introducing chamber or tube provided for the purpose. In the embodiment shown in FIG. 2, the fuel introducing tube 11 may have a box-shaped cross section as well as a circle-shaped one which is normally used. It goes without saying that a variety of changes may be allowed within the gist of the present invention.

As described above, the plate reformer of the present invention includes:

the reforming chamber having the reaction section filled with the reforming catalyst partitioned by the partition wall from the heat exchange section filled with the alumina balls; and the combustion chamber having the reaction section filled with the combustion catalyst partitioned by the partition wall from the heat exchange section filled with the alumina balls.

Hereinabove the reforming chamber is sandwiched with the combustion chambers in the way that the heat transfer plates are also sandwiched between the reforming and the combustion chambers, and the partition walls of the reforming and the combustion chambers should be approximately lined up, causing the reaction section of the reforming chamber and the heat exchange section of the combustion chamber to be attached with each other, and the heat exchange section of the reformer and the reaction section of the combustion chamber to be attached with each other as well. Gases flow from the reaction section to the heat exchange section in both reforming and combustion chambers, and to the combustion chamber the fuel introducing chamber that dispersedly introduces fuel or air to the combustion chamber is attached. Thus, the plate reformer demonstrates the excellent effects such as;

enabling the reforming material gas introduced to the reaction section of the reforming chamber to be heated by the sensible heat of the combustion gas transferred from the adjacent heat exchange section of the combustion chamber, as well as enabling the sensible heat of the reformed gas which moved to the heat exchange section of the reforming chamber to be transferred to the reaction section of the combustion chamber;

thus making the location of the graph-peaks of the reformed gas and the combusted gas in their temperature distribution coincident with each other without using a large amount of expensive catalysts; and achieving the further reduction of size of the whole system with less thickness by inserting the fuel or air introducing tube into the reaction section of the combustion chamber.

What is claimed is:

1. A plate reformer having a pair of combustion chambers, a reforming chamber in between the combustion chambers, and heat transfer plates sandwiched between the reforming chamber and the combustion chambers comprising:

an inlet end and an outlet end of the reforming chamber, the inlet end for introduction of reforming material gas and the outlet end for emission of reformed gas;

an inlet end and an outlet end of each combustion chamber, the inlet end for introduction of air and fuel and the outlet end for emission of combusted gas;

a gas permeable partition wall provided in the reforming chamber for partitioning the reforming chamber into a reforming reaction section having the inlet end of the reforming chamber and a heat exchange section having the outlet end of the reforming chamber, the reforming reaction section filled with reforming catalyst and the heat exchange section filled with heat transfer component; and a gas permeable partition wall provided in each combustion chamber for partitioning it into a combustion reaction section having the inlet end of the combustion chamber and a heat exchange section having the outlet end of the combustion chamber, the combustion reaction section filled with combustion catalyst and the heat exchange section filled with heat transfer component, wherein the inlet end of each combustion chamber is aligned to the outlet end of the reforming chamber and the inlet end of the reforming chamber is aligned to the outlet end of each combustion chamber, and the partition walls of the reforming chamber and the combustion chambers are provided such that they are approximately lined up and thus the reforming reaction section of the reforming chamber generally overlaps the heat exchange section of each combustion chamber, while the combustion reaction section of each combustion chamber generally overlaps the heat exchange section of the reaction chamber.

2. The plate reformer of claim 1, wherein the length of the reforming reaction section of the reforming chamber is longer than the length of the combustion reaction section of each combustion chamber and the length of the heat exchange section of the reforming chamber is shorter than the length of the heat exchange section of each combustion chambers.

3. The plate reformer of claim 1, wherein combustion air and fuel are introduced into the reaction section of each combustion chamber.

4. The plate reformer of claim 3, whereto a fuel introducing pipe with dispersion holes on its wall is inserted into each combustion chamber.

5. The plate reformer of claim 1, wherein the heat transfer component for filling the heat exchange sections with includes alumina balls.

6. A plate reformer having plural units piled together with fuel introducing chambers sandwiched between the units, each unit including a pair of combustion chambers, a reforming chamber in between the combustion chambers, and heat transfer plates sandwiched between the reforming chamber and the combustion chambers, the fuel introducing chamber having a number of dispersion holes and being sandwiched between one combustion chamber of one unit and another combustion chamber of another unit, comprising:

an inlet end and an outlet end of each reforming chamber, the inlet end for introduction of reforming material gas and the outlet end for emission of reformed gas;

an inlet end and an outlet end of each combustion chamber, the inlet end for introduction of air and fuel and the outlet end for emission of combusted gas;

a gas permeable partition wall provided in each reforming chamber for partitioning the reforming chamber into a reforming reaction section having the inlet end of the reforming chamber and a heat exchange section having the outlet end of the reforming chamber, the reforming reaction section filled with reforming catalyst and the heat exchange section filled with heat transfer component; and a gas permeable partition wall provided in each combustion chamber for partitioning it into a combustion reaction section having the inlet end of the combustion chamber and a heat exchange section having the outlet end of the combustion chamber, the combustion reaction section filled with combustion catalyst and the heat exchange section filled with heat transfer component, wherein the inlet end of each combustion chamber is aligned to the outlet end of each reforming chamber and the inlet end of each reforming chamber is aligned to the outlet end of each combustion chamber, and the partition walls of each reforming chamber and each combustion chamber are provided such that they are approximately lined up and thus the reforming reaction section of each reforming chamber generally overlaps the heat exchange section of each combustion chamber, while the combustion reaction section of each combustion chamber generally overlaps the heat exchange section of each reaction chamber.

7. The plate reformer of claim 6, wherein the length of the reforming reaction section of each reforming chamber is longer than the length of the combustion reaction section of each combustion chamber and thus the length of the heat exchange section of each reforming chamber is shorter than the length of the heat exchange section of each combustion chamber.

8. The plate reformer of claim 6, wherein the dispersion holes on a dispersion plate of the fuel introducing chamber are formed so that they be open to the combustion reaction section of the one combustion chamber and that of the another combustion chamber.

9. The plate reformer of claim 6, wherein the entrance of the fuel introducing chamber is designed so that flow direction in the fuel introducing chamber be the same as flow direction of air supplied from entrance of the one combustion chamber and the another combustion chamber to the combustion reaction sections of thereof.

* * * * *